United States Patent [19]
Vacha

[11] 3,988,033
[45] Oct. 26, 1976

[54] GLARE SHIELD

[76] Inventor: Fred P. Vacha, 226 Lombardy Ave., Fort Lauderdale, Fla. 33308

[22] Filed: Sept. 8, 1975

[21] Appl. No.: 610,983

[52] U.S. Cl. .............................................. 296/97 C
[51] Int. Cl.² ........................................... B60J 3/02
[58] Field of Search .............. 296/97 C, 97 D, 97 B; 211/45

[56] References Cited
UNITED STATES PATENTS

| | | | |
|---|---|---|---|
| 2,818,298 | 12/1957 | Goeske | 296/97 C |
| 3,499,679 | 3/1970 | Olander | 296/97 C |
| 3,695,658 | 10/1972 | Vacha | 296/97 C |

Primary Examiner—M. H. Wood, Jr.
Assistant Examiner—David M. Mitchell
Attorney, Agent, or Firm—Malin & Haley

[57] ABSTRACT

An improved glare shield which is adapted to be attached to an automobile sun visor to shield the driver's eyes from oncoming headlight glare in an adjacent oncoming traffic lane while not impairing the driver's vision in his lane. The device includes a pair of tinted, transparent shield members coupled together by an inconspicuous wire-form connector which retains both shield members in a common plane. The shield member connector makes the operational positioning of the shield members easier and safer by interlocking the shield members together such that movement of one shield member effects movement of both shield members.

3 Claims, 3 Drawing Figures

GLARE SHIELD

BACKGROUND OF THE INVENTION

This invention relates generally to an improved glare shield, and specifically to a device for shielding the eyes of a vehicular driver at night to protect the driver from the glare of headlights from traffic in an adjacent oncoming lane, the instant invention being an improvement of Applicant's glare shield device shown in U.S. Pat. No. 3,695,658, issued Oct. 3, 1972, the disclosure of which is hereby incorporated into this application.

The glare shield disclosed in the Applicant's cited patent includes a pair of tinted, transparent vision shield members which are laterally and separately adjustable along a horizontally disposed supporting frame attached to a vehicle sun visor, the adjustment being necessary to provide proper shielding for drivers having different eye separations so that the glare shield members are spaced laterally apart to fit the driver's eye spacing. Once the proper lateral separation of the tinted shield members has been achieved, the vehicle operator need only to pivot the shield members relative to the sun visor into or out of the operational position for utilization of the device. The shield members shown in U.S. Pat. No. 3,695,658 pivot independently on the frame support between the operational and storage positions. Thus, an operator to utilize the glare shield must move each shield member to its desired position. The present invention provides an inconspicuous shield member interlock which does not interfere with the operator's vision and allows for the positioning of both shield members with the actuation of a single shield member. In one embodiment the shield member interlock includes a retaining channel which permits individual lateral adjustment of each shield member.

BRIEF DESCRIPTION OF THE INVENTION

An improved glare shield for protecting the vision of a vehicle driver from headlight glare of oncoming traffic while retaining unimpaired vision in the driver's lane comprising a unitary wire frame, said frame including means connected at the terminal ends of said frame for coupling the frame to a vehicle sun visor, a pair of tinted transparent shield members pivotally connected to said supporting frame, a hinge member connected to each of said shield members for coupling said shield to said frame, a slidable friction block connected in a recessed portion of each of said shield members and a means for interlocking the shield members together so that pivotal movement of one shield member effects positioning of both shield members together. The shield interlock in one embodiment may be a wire form having a terminal looped end portion and a pair of looped hooks at the opposite free ends of the wire, the wire form to provide a shield member retaining channel permitting lateral movement of each shield member. The shield interlock is attached to the frame to allow movement with shield member movement. Initial operational adjustment of each shield member is accomplished in accordance with the disclosure in Applicant's U.S. Pat. No. 3,695,658. A pair of spacer coils are connected on the frame to prevent lateral movement of the shield member interlock. The hook ends and terminal loop end are engaged about the frame in such a way that the frame requires no structural modification of the mounting of the shield interlock.

To operate the improved glare shield, the driver need only rotate one shield member when moving the shield between the operational and non-operational modes without having to position each shield individually. The shield member interlock thus insures for easier and faster implementation of the glare shield for safer night driving. Either shield member can be manually engaged to position both shields simultaneously.

It is an object of this invention to provide an improved glare shield disclosed in Applicant's U.S. Pat. No. 3,695,658.

It is another object of this invention to provide an improved glare shield in which the shield members may be simultaneously moved by the manual movement of one shield member only.

But still yet another object of this invention is to provide a device for shielding oncoming headlight glare having improved ease of operation and safety features.

But yet still another object of this invention is to provide a glare shield having an inconspicuous shield member interlock for coupling the shield members together in a common plane.

In accordance with these and other objects which will be apparent hereinafter, the instant invention will now be described with particular reference to the accompanying drawings.

PREFERRED EMBODIMENT OF THE INVENTION

Figure 1:
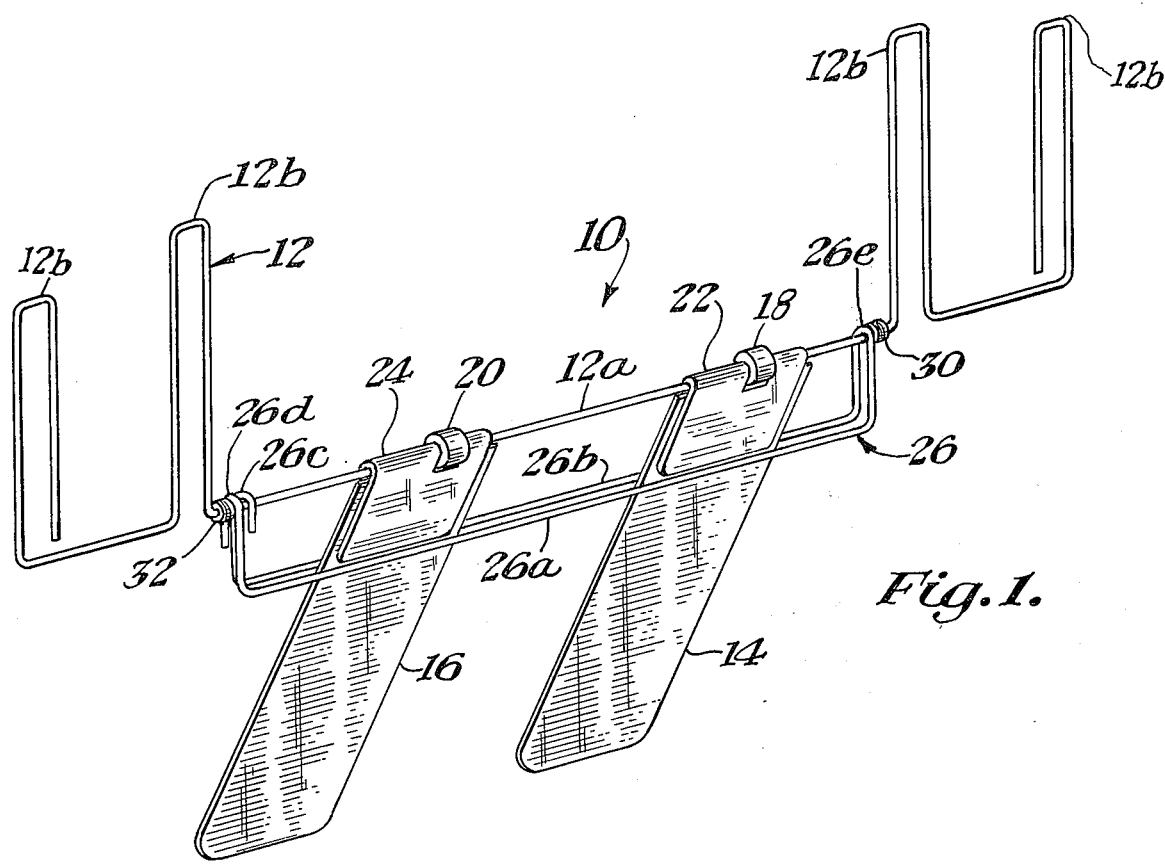
FIG. 1 shows a perspective view of a glare shield constructed in accordance with the instant invention.

Referring now to the drawings and especially FIG. 1, Applicant's improved glare shield is shown generally at 10 comprised of a frame 12, which may be constructed of wire or a similar material, having a center shield member supporting portion 12a and terminal portions 12b which are constructed to provide a means for mounting the frame to a conventional vehicle sun visor. A pair of transparent, tinted optical shields 14 and 16 are pivotally connected to the frame 12a by hinges 22 and 24 respectively. The hinges 22 and 24 are fastened to shields 14 and 16 providing a frictional connection which impedes pivotal motion of the shields 14 and 16. The upper edges of shield members 14 and 16 firmly abut frame supporting portion 12a to prevent rotational movement in the plane of the shield members 14 and 16. Also connected to frame 12a are friction blocks 18 and 20 which are constructed of rubber or similar frictional material and disposed within recesses within the shields 14 and and 16 and hinges 22 and 24 respectively to maintain lateral positioning of shields 14 and 16 notwithstanding numerous pivotal movements of the shields during use.

The shield interlock 26 connects shield members 14 and 16 together for simultaneous movement about frame 12, retaining the shields 14 and 16 in a common plane by having shield member retaining arms 26a and 26b, disposed on opposite sides of shield members 14 and 16 and a terminal loop portion 26e perpendicular to arms 26a and 26b which is looped about frame 12a. The free ends of the shield interlock 26 have hooked portions 26c and 26d perpendicular to arms 26a and 26b which connect about the opposite end of frame portion 12a. A pair of retaining spacers, small coils of wire 30 and 32, are coiled around lateral frame 12a at each end and are disposed on the outside ends of the shield interlock 26 to prevent lateral movement of the shield interlock. The lower edges of hinges 22 and 24 abut arms 26a and 26b to prevent accidental disengagement of shield interlock 26 from frame 12.

Figure 2:
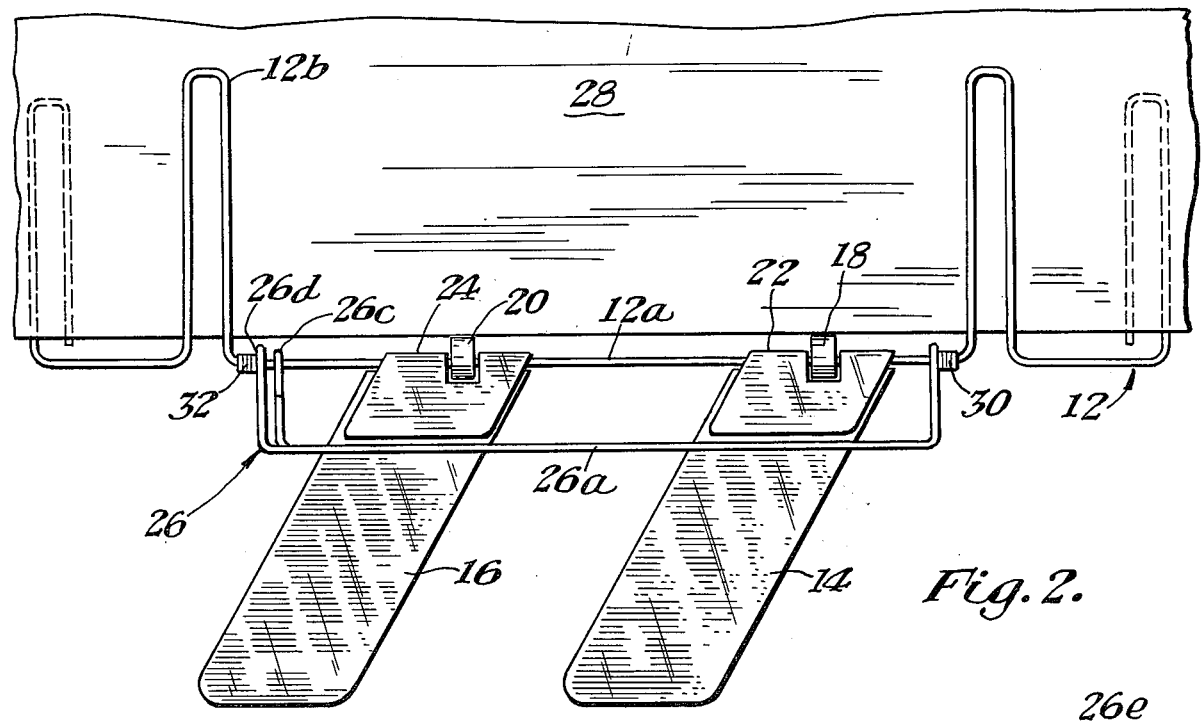
FIG. 2 shows a front elevational view of a glare shield constructed in accordance with the instant invention as coupled to an automobile visor.

FIG. 2 shows the instant invention attached to a vehicle sun visor and is shown in the operational position. Each shield member 14 and 16 can be moved laterally along the frame support portion 12a to provide proper spacing and lateral separation for adjustment to an individual driver's eye spacing. To position the tinted, transparent shield members, the driver of a vehicle need only manually rotate one of the shields or the shield interlock itself to effect the movement of both shields either to the operating position or to the storage position (adjacent the vehicle sun visor).

Figure 3:
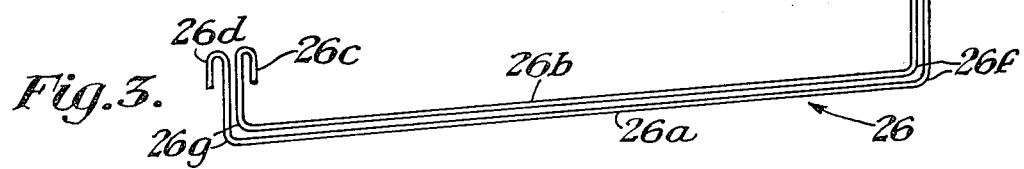
FIG. 3 shows the shield member interlock.

FIG. 3 shows the shield interlock which, in the preferred embodiment, is comprised of a wire 26 which is bent near its mid-section forming a half loop at 26e, bifurcating the wire into branches 26a and 26b with a perpendicular bend of both branches at 26f and 26g. The free ends of the wire having retaining hooks which are bent looped portions 26c and 26d, the construction allowing for easy installation and connection to the frame supporting bar 12a (FIG. 2). The thin wire body of the interlock does not interfere with the driver's vision. The space between bifurcated arms 26a and 26b is sized to resiliently clamp each shield member between the arms to resist unintentional lateral displacement.

The shield interlock connecting both shield members together permits faster utilization and mobilization of the device by the driver, with minimum driver distraction, which increases the safety of the device. The suddeness of oncoming headlight glare which can be experienced while traversing straight roads or around curves or on hills and the like require fast driver response for reducing headlight glare by utilizing the glare shield.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A glare shield device adapted for attaching to an automobile sun visor providing a separate shield aligned with each of a driver's eyes so that the left side of the road is shielded from glare and the driver's lane remains unshielded for a clear view comprising:

an elongated single member frame;

means at the opposed terminal end portions of said frame for attaching the frame to an automobile sun visor;

a pair of laterally adjustable elongated parallely disposed glare shield members hinged at one end thereof intermediate the end portions of said frame and extending obliquely downwardly therefrom so as to be substantially coincident with the line of travel of oncoming headlights, said members having a width adapted to intercept only those light rays within the cone of vision of each of the driver's eyes to shield each eye from oncoming headlights while retaining a clear view of the driver's lane; and a means for connecting and retaining said glare shield members in a common plane while permitting independent lateral adjustment of said glare shield members.

2. In a glare shield connectable to a vehicular sun visor including a frame, a means at the opposed terminal end portions of said frame for attaching the frame to an automobile sun visor, a pair of laterally adjustable, elongated, parallely-disposed, tinted, transparent glare shield members and a pair of hinges having lower edges, each hinge connecting a different shield member to said frame intermediate the end portions of said frame, the improvement comprising:

a glare shield coupling means confining each of said glare shield members for retaining both of said glare shield members in a common plane while permitting independent lateral movements of said glare shield members for adjustment to the driver's eyes.

3. The improvement, as in claim 2, wherein said coupling means includes:

a substantially inconspicuous wire-form body, said body including a pair of shield member retaining arms, said arms abutting the lower edges of said hinges.

* * * * *